US005806302A

United States Patent [19]
Cariola et al.

[11] Patent Number: 5,806,302
[45] Date of Patent: Sep. 15, 1998

[54] VARIABLE FAN EXHAUST AREA NOZZLE FOR AIRCRAFT GAS TURBINE ENGINE WITH THRUST REVERSER

[75] Inventors: Roy E. Cariola; Michael R. Aten, both of San Diego, Calif.

[73] Assignee: Rohr, Inc., Chula Vista, Calif.

[21] Appl. No.: 719,080

[22] Filed: Sep. 24, 1996

[51] Int. Cl.⁶ .............................. F02K 1/09; F02K 1/04; F02K 3/04
[52] U.S. Cl. .......................... 60/204; 60/271; 60/226.2; 60/226.1; 239/265.29; 239/265.33; 244/110 B
[58] Field of Search ................................. 60/204, 226.2, 60/230, 232, 271, 226.1, 262; 239/265.19, 265.27, 265.29, 265.31, 265.33; 244/110 B

[56] References Cited

U.S. PATENT DOCUMENTS

| | | | |
|---|---|---|---|
| 2,496,351 | 2/1950 | Mazzoni | 60/271 |
| 2,638,961 | 7/1953 | Britton et al. | 60/271 |
| 3,779,010 | 12/1973 | Chamay et al. | 60/226.2 |
| 3,797,785 | 3/1974 | Baeressen et al. | 239/265.31 |
| 3,814,325 | 6/1974 | McCardle, Jr. et al. | 60/271 |
| 3,829,020 | 8/1974 | Stearns | 239/265.13 |
| 3,837,577 | 9/1974 | Presz, Jr. | 239/265.33 |
| 3,841,091 | 10/1974 | Sargisson et al. | 60/271 |
| 4,383,407 | 5/1983 | Inman | 239/265.33 |
| 4,537,026 | 8/1985 | Nightingale | 239/265.19 |
| 4,802,629 | 2/1989 | Klees | 60/271 |
| 4,922,713 | 5/1990 | Barbarin et al. | 60/226.2 |
| 5,655,360 | 8/1997 | Butler | 60/226.2 |

FOREIGN PATENT DOCUMENTS

| | | | |
|---|---|---|---|
| 1421153 | 1/1975 | United Kingdom | 60/226.2 |

OTHER PUBLICATIONS

Rolls Royce plc, "The jet engine", pp. 199–205, 1986.

*Primary Examiner*—Charles G. Freay
*Assistant Examiner*—Ted Kim
*Attorney, Agent, or Firm*—Patrick J. Schlesinger

[57] ABSTRACT

A structure to provide a variable nozzle for the fan air flow of a turbofan aircraft gas turbine engine with the nozzle being defined by the exit throat area defined by the aft edge of a trailing edge portion of the fan cowl and the core engine housing. A trailing edge cowl portion is slidably positioned in a rearwardly opening annular cavity in the aft end of the fan cowl for reciprocal axial translation between a deployed position to provide an enlarged exit throat area to provide enhanced performance of the aircraft engine during take off and climb to a cruising altitude and a stowed position to provide an optimum exit throat area for cruise condition of the engine. The trailing edge portion is sealably secured within the core cowl cavity to preclude any air leakage from the fan air stream of the fan duct around the trailing edge portion. A unique dual slider and track arrangement is provided to permit the variable nozzle to be translated aft simultaneously with and/or independently of a translating cowl portion of the fan cowl which may form a portion of a blocker door/cascade thrust reverser structure. The trailing edge portion includes sound attenuation treatment on its inner surface for exposure which when deployed enhances the sound attenuation capability of the nacelle system. The variable nozzle may also be used to advantage with other thrust reverser systems such as a four pivoting door structure positioned in the fan cowl.

20 Claims, 6 Drawing Sheets

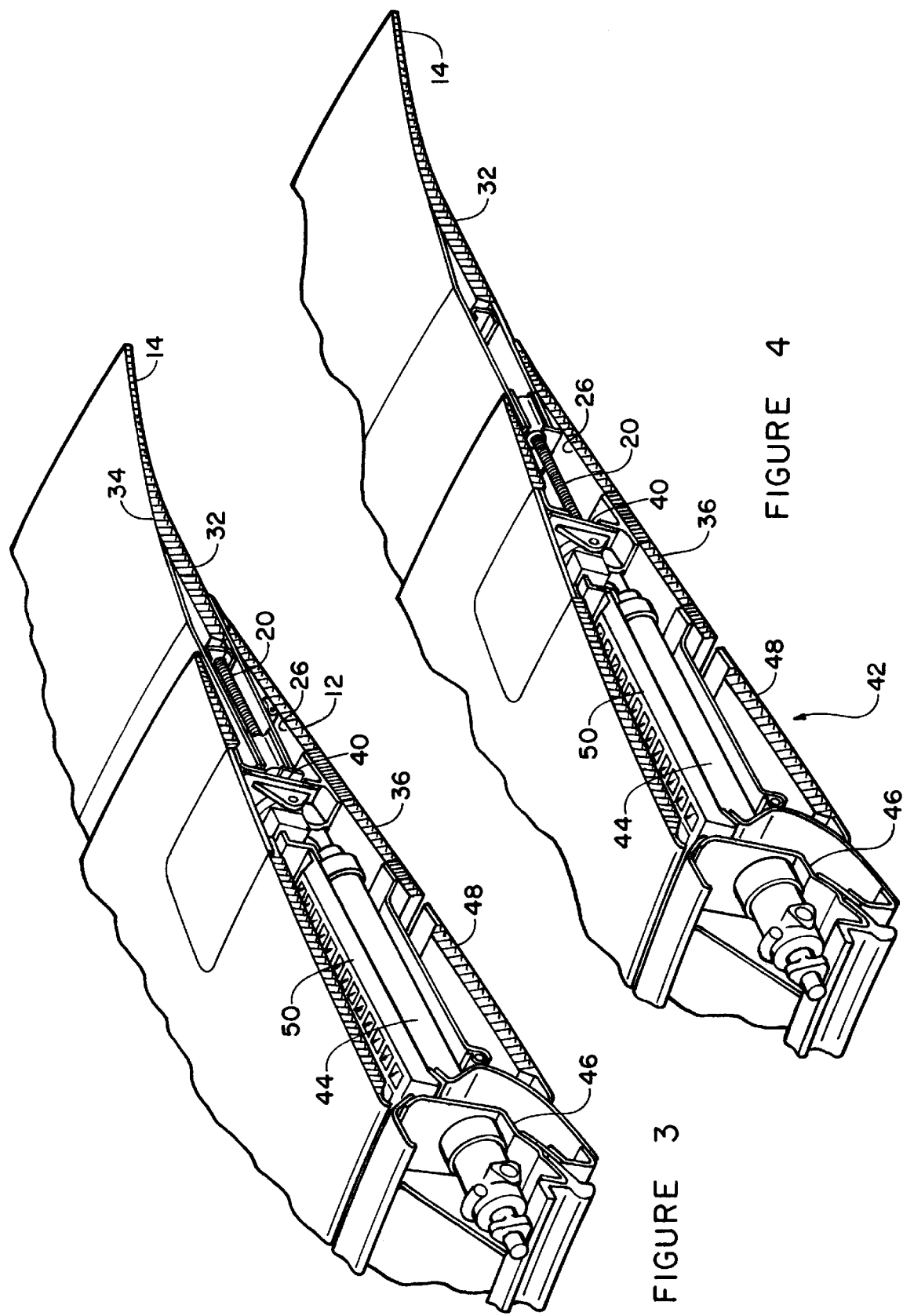

VARIABLE FAN EXHAUST AREA NOZZLE FOR AIRCRAFT GAS TURBINE ENGINE WITH THRUST REVERSER

BACKGROUND OF THE INVENTION

1. Field of the Invention

The present invention relates to an improvement in variable nozzle structure for an aircraft gas turbine engine and more particularly, but not by way of limitation, to a variable nozzle structure that is simple, low cost and particularly adapted for application to the nozzle for the fan air stream of a turbofan gas turbine engine that is used in commercial applications

2. Prior Art

It is known in the field of aircraft gas turbine engines that optimum performance of the engine may be achieved during different flight conditions of an aircraft by tailoring the exit throat area of the fan air stream of the engine for each specific condition such as take off, flight, combat maneuver, and the like. In combat aircraft the necessity to achieve the specific mission has permitted the extra cost, added weight, and added complexity required for a variable nozzle structure to be accommodated. However, in the field of commercial aircraft such considerations have precluded the incorporation of a variable nozzle for the fan duct of a turbofan gas turbine engine propulsion system.

While a number of patents exist in the prior art that pertain to variable nozzle arrangements, in general they have utilized the same approach, namely a plurality of tiltable flaps circumferentially arranged at the trailing edge of a nozzle whereby the flaps may be tilted inwardly or outwardly to vary the nozzle area. For example, U.S. Pat. No. 5,261,227 issued on Nov. 16, 1993 to R. G. Giffin, III for a VARIABLE SPECIFIC THRUST TURBOFAN ENGINE discloses a aircraft turbofan engine where the fan outer duct includes a variable area first exhaust nozzle disposed at an aft end of the fan casing. A flow splitter divides the fan duct into first and second exhaust nozzles with the aft end of such first and second exhaust nozzles being provided with a plurality of circumferentially arranged contiguous tiltable flaps that are actuable to vary such nozzles.

U.S. Pat. No. 3,386,247 issued on Jun. 4, 1968 to C. H. Gross et al for a POWERPLANT WITH THRUST REVERSER discloses a turbofan aircraft turbine engine which is provided with a plurality of tiltable flaps which are circumferentially arranged around the aft end of the nozzle for the core engine exhaust. The flaps are tiltable inwardly to vary the exhaust nozzle area and are tiltable outwardly for spoiling the thrust of nozzle when it is desired to reverse the thrust of the engine.

U.S. Pat. No. 3,347,467 issued on Oct. 17, 1967 to H. A. Carl et al for a COMBINATION JET EXHAUST NOZZLE AND THRUST REVERSER discloses a combined combination annular variable area convergent-divergent exhaust nozzle and thrust reverser and actuation system for use with a turbojet or turbofan engine for high speed aircraft, such as supersonic aircraft. Primary flaps forming the convergent portion of the nozzle and a plurality of secondary flaps downstream of the nozzle throat are provided with the secondary flaps defining the exit area and forming the divergent portion of the nozzle. Such flaps are tiltable to vary the throat area as desired with the primary flaps acting as blocker doors for thrust reversal purposes.

U.S. Pat. No. 4,052,007 issued on Oct. 4, 1977 to C. M. Willard for a FLAP-TYPE TOW-DIMENSIONAL NOZZLE discloses an arrangement using primary and secondary flaps to control the internal throat area, to provide a reverse thrust position, and to provide a plurality of differential positions which provide for thrust vectoring and modulated thrust.

U.S. Pat. No. 4,382,551 issued on May 10, 1983 to E. B. Thayer for a FLAP-TYPE NOZZLE WITH BUILT-IN REVERSER discloses an exhaust nozzle/thrust reverser having four exhaust nozzle flaps with a thrust reverser door built into to each flap. The flaps are hinged at their forward edge to form the divergent portion of a convergent/divergent exhaust nozzle in combination with a plurality of internally arranged tiltable flaps which provide the variable convergent portion of the nozzle.

U.S. Pat. No. 2,972,860 issued to T. K. Moy on Feb. 28, 1961 for a COMBINED VARIABLE EJECTOR AND THRUST REVERSER discloses a plurality of variable hinged flaps that provide a variable nozzle for an exhaust stream in combination with a target type thrust reverser.

U.S. Pat. No. 4,865,256 issued on Sep. 12, 1989 for a TURBOJET ENGINE HAVING A THRUST REVERSER DOOR AND VARIABLE EXHAUST CROSS-SECTION discloses a pivoting door thrust reverser which permits the thrust reverser doors arranged at the end of a fixed fan cowl to be tilted outwardly to vary the area of the thrust nozzle.

As noted, the aforementioned arrangements are concerned with providing tiltable flaps arranged at the aft end of the fan air stream and/or core engine exhaust to vary a nozzle area and for thrust vectoring and/or thrust modulation. All such arrangements are complicated, add additional weight and drag, and are generally intended for purposes only where such negative aspects can be tolerated for purposes of accomplishment of a particular mission. Accordingly, in view of the requirements of the disclosed prior art arrangements a requirement exists for a simplified, low cost, low weight, improved variable nozzle particularly adapted for turbofan gas turbine engines utilized for commercial aircraft.

Thus, it is a general object of the present invention to provide an improved variable nozzle that is light in weight, low in cost, and which provides a simple structure for varying the exit throat area of the fan air stream of a aircraft turbofan engine to provide an optimum throat area for varying flight conditions of an aircraft.

It is a further general object of the present invention to proved a variable nozzle for the fan air stream of a turbofan aircraft engine that may be used in cooperation with a fan air stream reverser.

It is yet a further general object of the invention to provide a structure for varying the exit throat area of the fan duct and which may be deployed simultaneously with or independently of an associated fan air stream thrust reverser.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates a structure to provide a variable nozzle for the fan air flow of a turbofan aircraft turbine engine, the nozzle being defined by the spacing between a trailing edge portion of the fan cowl and the core engine housing to provide a determinable exit throat area. The variable nozzle includes a generally annularly shaped fan cowl that is spaced from and which surrounds a portion of the housing of the core jet engine with the fan cowl having an annular axially extending cavity provided at its trailing edge. A nozzle trailing edge portion is positionable within said cavity and is reciprocally extensible from a first stowed position to a second extended deployed position whereby the throat are may be varied by a predetermined amount in order to provided an optimum throat area for a flight condition of such turbofan engine. The trailing edge portion extends a predetermined distance from within such cavity to provide the trailing edge of the fan cowl and is provided on its inner surface with a sound attenuation structure. Thus, when the trailing edge portion if determinably extended from within such cavity a greater portion of such sound attenuation structure is exposed to further attenuate the sound of such air stream.

In a preferred embodiment of the invention, the fan cowl includes a first forward fixed portion and a second aft translating cowl which is provided with said cavity. A blocker door/cascade type thrust reverser structure is provided for the fan cowl so that upon aft translation of the translating portion of the fan cowl the blocker doors are actuated to expose the cascade structure for reversing the fan air stream and directing it outward and forwardly in a predetermined direction. An actuator arrangement is carried within the translating fan cowl and cooperates with the trailing edge portion to reciprocally extend such edge portion from within the cavity in the translating cowl. By means of an unique double slider track structure, the aft motion of the translating edge portion may be made independently of the aft motion of the thrust reverser translating cowl portion so that a differential variety of positions of the combined variable nozzle and thrust reverser is provided.

The foregoing has outlined rather broadly the more pertinent and important features of the present invention in order that the detailed description of the invention that follows may be understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set froth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3. is a partial perspective, shown in cut away, of the variable nozzle structure as illustrated in FIG. 1.

FIG. 4 is a partial perspective, shown in cut away, of the variable nozzle structure as illustrated in FIG. 2.

Similar numerals refer to similar parts in all FIGURES.

DETAILED DESCRIPTION OF THE INVENTION

Figure 1:
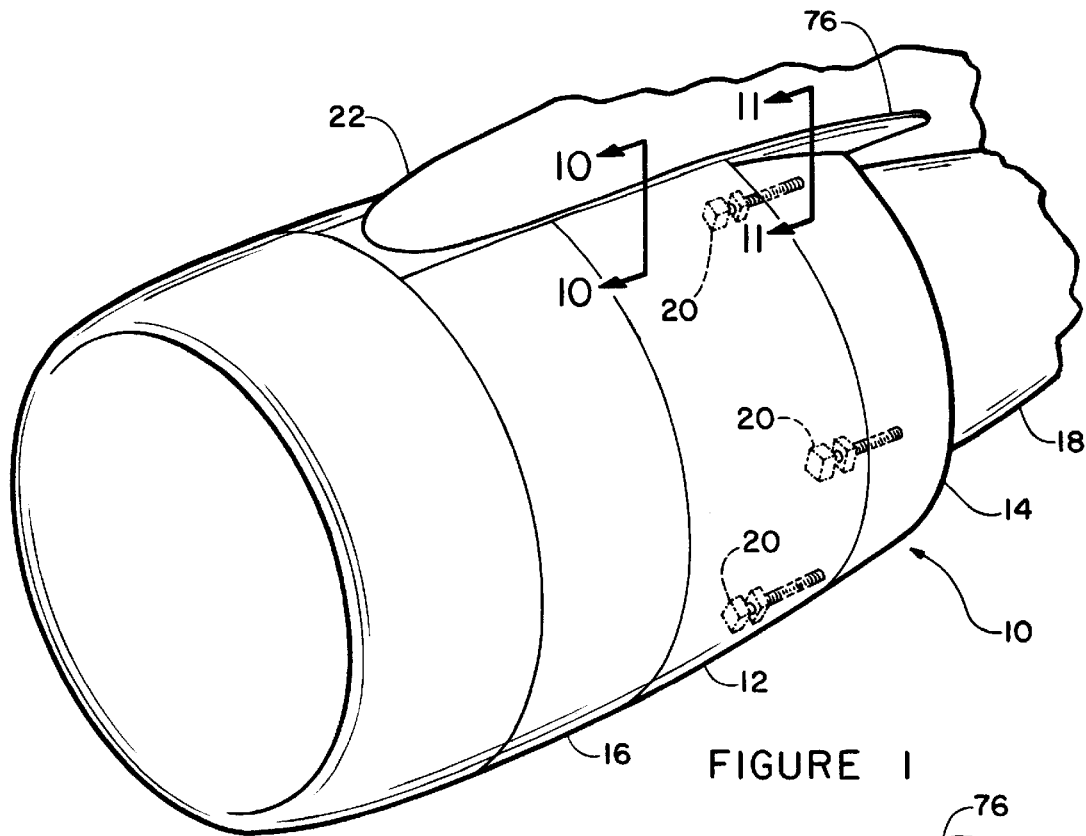
FIG. 1 is a partial perspective view of a variable nozzle structure incorporated in a turbofan aircraft propulsion system constructed in accordance with a preferred embodiment of the present invention and illustrating such structure in a stowed position.
Figure 2:
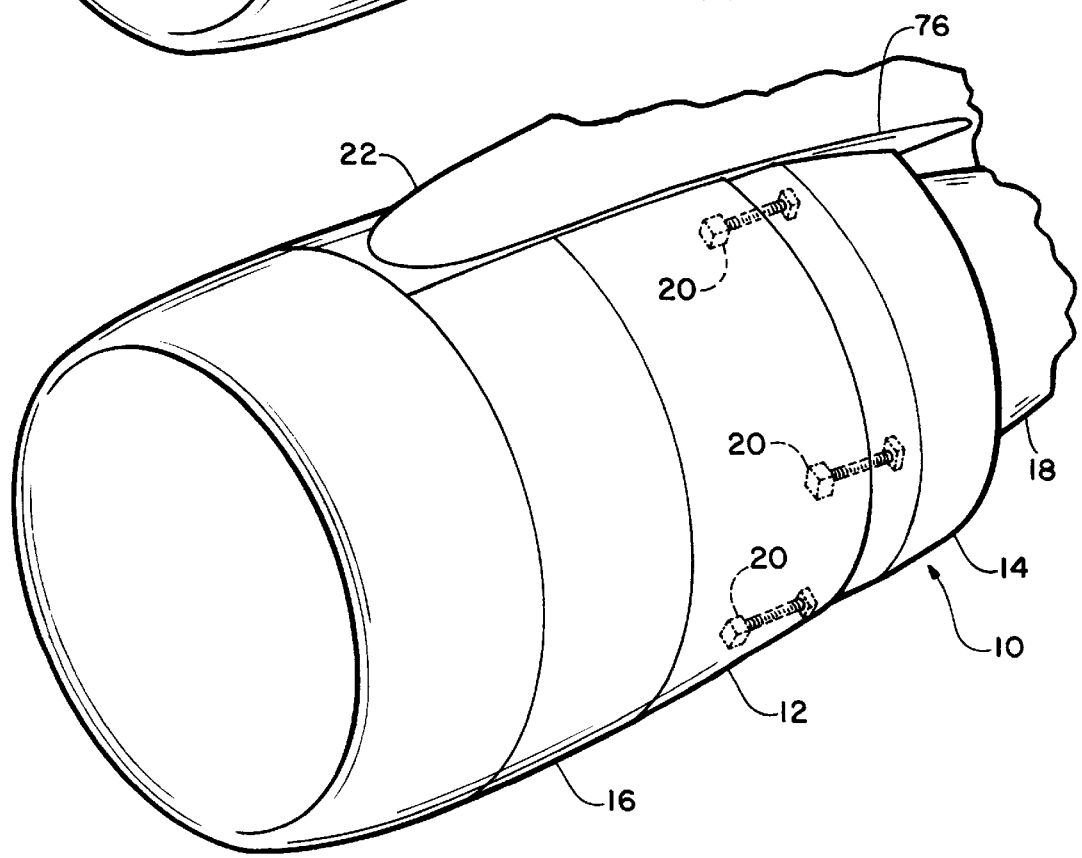
FIG. 2 is a partial perspective view of the variable nozzle structure of FIG. 1. shown in a deployed position.

Referring now to the drawings in detail and in particular to FIGS. 1 and 2, the reference character 10 generally designates a variable nozzle structure constructed in accordance with a preferred embodiment of the invention. The variable nozzle structure 10 includes a generally annularly shaped fan cowl 12 which receives, as will be shown in greater detail hereinafter, a trailing edge cowl portion 14 of the fan cowl 12. For the illustrated embodiment of the invention, the fan cowl 12 is considered to be a translatable fan cowl which cooperates with a fixed fan cowl portion 16 to comprise a fan cowl for the rotating fan blades (not shown) of the core aircraft gas turbine engine having a core engine housing 18 which defines with the trailing edge portion 14 an exit throat area for the fan air stream. The fixed fan cowl 16 and the translating cowl 12 with the trailing edge cowl portion 14 cooperate with the core engine housing 18 to provide a fan duct for the fan air stream of a turbofan aircraft gas turbine engine (not shown).

A plurality of circumferentially arranged actuators (shown in phantom) in FIGS. 1 and 2 provided for translation of the trailing edge portion 14 from a stowed position, as seen in FIG. 1, to a deployed position, as seen in FIG. 2. It will be understood that the translating cowl 12 and the trailing edge portion 14 are bifurcated from a bifurcation panel 24, seen more clearly in FIG. 10. Such a bifurcation of cowls and other components of a nacelle systems is well known in the art. The components 12, 14, and 16 are secured to the pylon 22 in a manner well known in the art and comprise a portion of the aircraft propulsion system.

Referring now to FIGS. 3 and 4, cut away perspective views will further illustrate the novel invention. The translating cowl 12 is provided at its aft edge with a rearwardly opening cavity 26 which slidably receives a portion of the trailing edge portion 14 which is reciprocally positioned therein. The cavity 26 is provided with a plurality of lower spaced slider means 28 and 30 and an upper slider means 31, as seen more clearly in FIG. 9, to ease the reciprocal translation of the trail ling edge portion 14 within the cavity 26 and to preclude air from the fan air stream flowing aft under pressure through the fan duct from leaking through the interface between the translating cowl 12 and the trailing edge portion 14. In the illustrated embodiment, the rub strips 28, 30, and 31, as seen more clearly in FIG. 9, take the form of suitable members that are suitably secured to the lower and upper inner surfaces of the cavity 26 for sliding and sealing engagement with the trailing edge portion 14. The rub strips are made of a suitable anti-friction material. The rub strip members 28, 30 and 31 provide a secondary sealing arrangement between the translating cowl 12 and the trailing edge cowl portion 14 as will be discussed in detail hereinafter.

As will also be seen in FIGS. 3 and 4, an inner portion of the trailing edged portion 14 is provided with a suitable sound attenuation treatment 32 which uses a honeycomb core 34 to attenuate in a predetermined manner sound of the fan air stream. The translating cowl 12 is also provided with a similar sound attenuation treatment 36 on its inner surface. As seen in FIG. 4, when the trailing edge portion 14 is translated aft to a fully deployed position an additional portion of the sound attenuation structure 32 carried by the trailing edge portion 14 is exposed to the fan air stream to complement the sound attenuation structure 36 of the translating cowl 12.

The trailing edge portion 14 is reciprocally positioned between the stowed position seen in FIG. 3 and the deployed position seen in FIG. 4 by a suitable actuation means. In the illustrated embodiment of the invention, this actuation means takes the form of a suitable ball and screw actuator 20 which is suitably secured at its aft end to the trailing edge portion 14 and at its forward portion to a bulkhead 40 of the translating cowl 12. While the actuation means is shown as comprising a ball screw type actuator 20 other actuation means such as an hydraulic actuator, would be acceptable.

The variable nozzle structure 10 of the present invention is advantageously used with a complementary thrust reverser structure for blocking the fan air stream and directing it outwardly and forwardly in a predetermined manner. For purposes of illustration the present invention is shown in combination with a blocker door and cascade type thrust reverser. However, it can be used to advantage with other types of thrust reversers such as the pivoting door type shown in U.S. Pat. Nos. 4,410,152 and 4,485,970. Thus, the illustrated combination thrust reverser and the variable nozzle are intended to be illustrative only and not limiting.

Such an illustrative thrust reverser is seen in FIGS. 3 and 4, and also in other FIGURES discussed in detail later herein. Such illustrative blocker door and cascade thrust reverser, generally designated 42, includes the translating cowl 12 that is reciprocally driven between the stowed position of FIG. 3 and the deployed thrust blocking position shown elsewhere herein, such as FIG. 6, by a suitable actuator 44 that is secured at its aft end to the bulkhead 40 and its forward end to a bulkhead 46 of the fixed portion 16 of the fan cowl. As a plurality of actuators 20 are circumferentially arranged to provide reciprocal translation of the variable nozzle portion 14, similarly a plurality of actuators 44 are circumferentially arranged as required to provide the required translation of the translating cowl 12. When the translating cowl 12 is deployed aft to a thrust blocking position, a space is provided between the forward end of the translating cowl 12 and the aft end of the fixed fan cowl portion 16 and blocker doors 48 are rotated downwardly into contact with the core engine housing 18 to block the fan air stream flowing through the fan duct and to direct such stream outwardly. A plurality of cascade structures 50 are circumferentially arranged and are secured to the fixed fan cowl 16 to direct the blocked fan air stream outwardly and forwardly in a predetermined manner as is well known in the art. The systems for actuating the actuators 20 and 44 are well known in the art and for ease of illustration are not shown herein.

Figure 5:
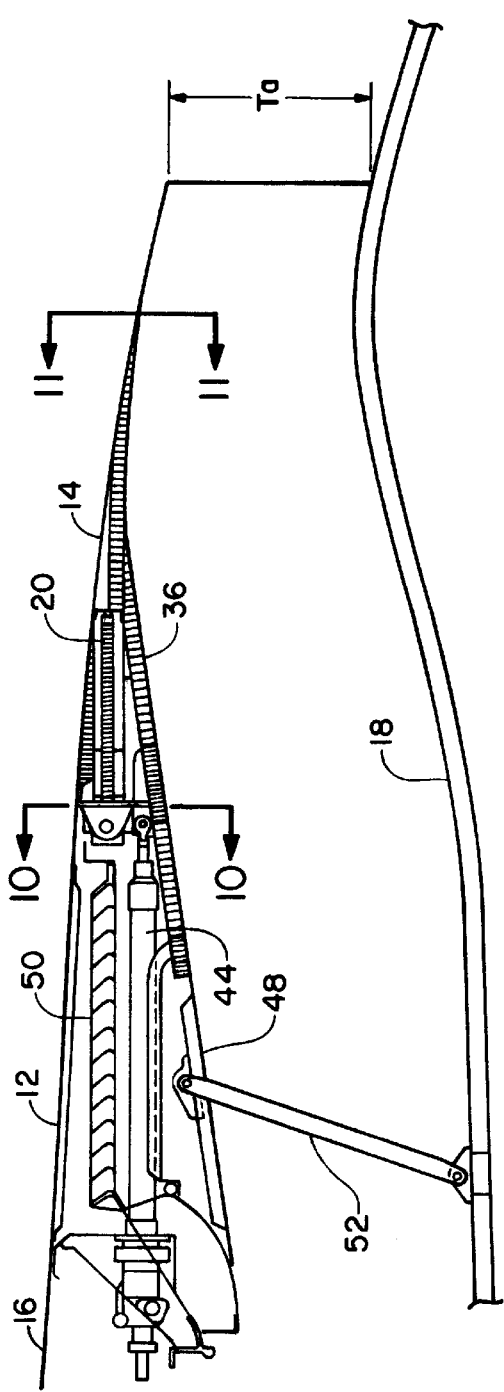
FIG. 5 is a partial cross section of the structure of FIG. 1.
Figure 6:
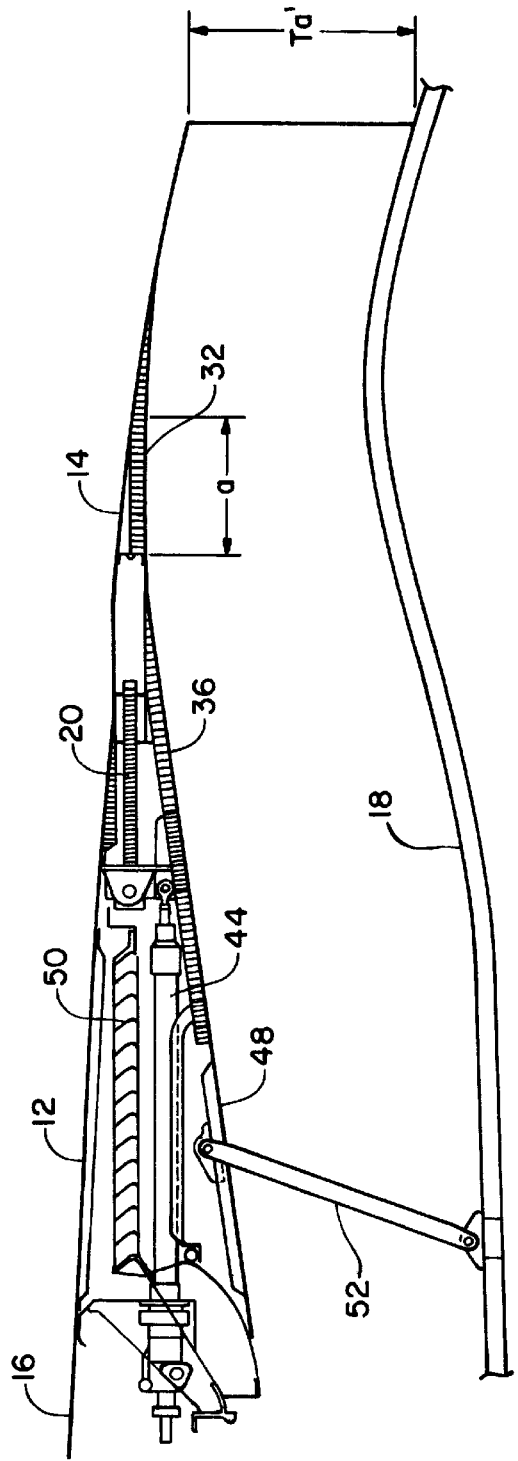
FIG. 6 is a partial cross section of the structure illustrated in FIG. 2.

Referring now to FIGS. 5 and 6, a first aspect of the operation of the novel invention will be illustrated. It will now be illustrated how the variable nozzle of the present invention permits the most efficient nozzle sizing for varying flight conditions of an aircraft. The throat area of the variable nozzle 10 is defined by the distance between the aft end of the trailing edge portion 14 and the core engine housing 18. This exit throat area for the fan duct is shown in FIG. 5 as Ta and represents the exit throat area that would be most efficient for the cruise condition of the aircraft, during which condition the trailing edge cowl portion 14 is in a fully stowed position as illustrated. FIG. 6 then illustrates the deployment of the trailing edge portion aft to increase the exit throat area of the fan duct. It will be understood that the core engine housing 18 characteristically has what is termed a "Coke bottle" shape toward its aft end as it is configured to accommodate the turbine portion of the turbofan engine. The throat area of the fan duct would have a lesser area forward of the exit throat area since the core engine housing 18 gradually slopes outwardly toward the nozzle opening of the core engine.

When the aircraft is in a take off condition and climbing until it reaches a cruise altitude it is desirable to increase the exit throat area of the nozzle. The variable nozzle 10 permits such expansion of the exit throat area of the fan duct by axially translating the trailing edge portion 14 aft to a deployed position. Since the trailing edge portion 14 is translating axially the exit throat area is increased to Ta', as the outer surface of the core engine housing 18 gradually slopes inwardly, to define an enlarged exit throat area. For an exemplary illustration, the exit throat area Ta' is considered to over 10 per cent greater than the exit throat area Ta that is used during normal cruise conditions. Generally speaking, it is considered that for a typical application of a high bypass turbofan engine the variable nozzle 10 used in combination with a typical blocker door/cascade type thrust reverser the exit throat area can be increased from that employed for a cruise position by an amount greater than 10%. Further, it should be considered that an increase of around 15% over the stowed position exit throat area can be achieved.

Axial translation of the trailing edge cowl portion 14 aft to a deployed position also acts to expose an additional amount of the sound attenuation 32 provided in the inner surface of the portion 14 to further enhance the sound attenuation capability provided by the variable nozzle structure 10 and by the nacelle system in general. Such an additional exposure of sound attenuation treatment 32 is shown by the letter "a" in FIG. 6.

Figure 7:
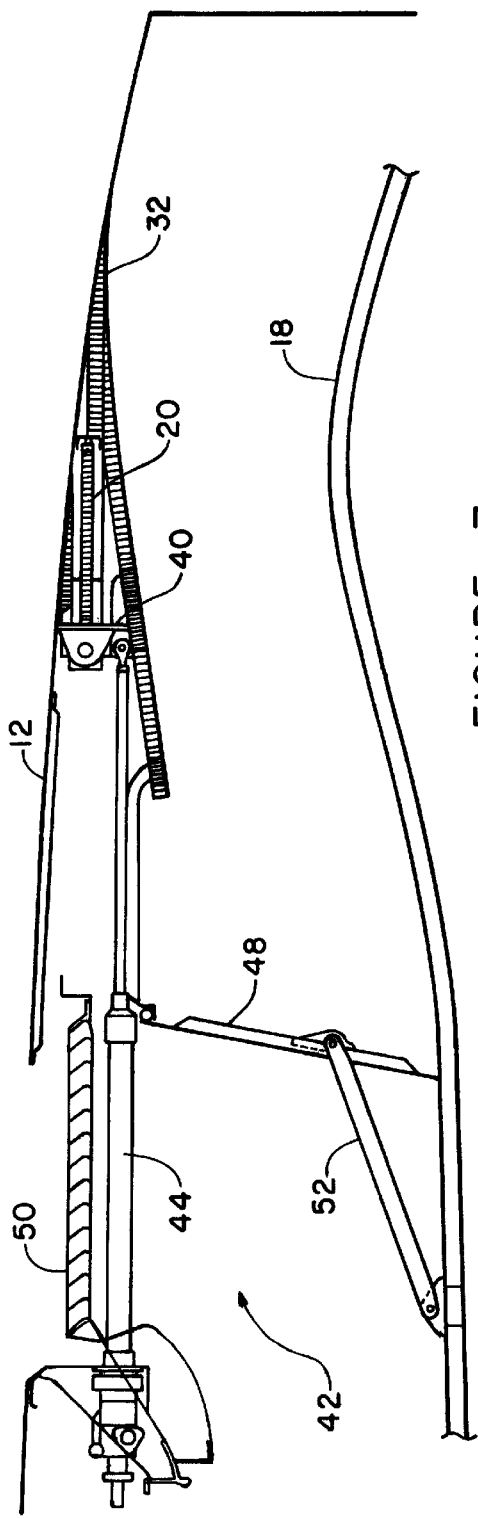
FIG. 7 is a partial cross section of the structure illustrating the thrust reverser deployed while the variable nozzle structure is stowed.
Figure 8:
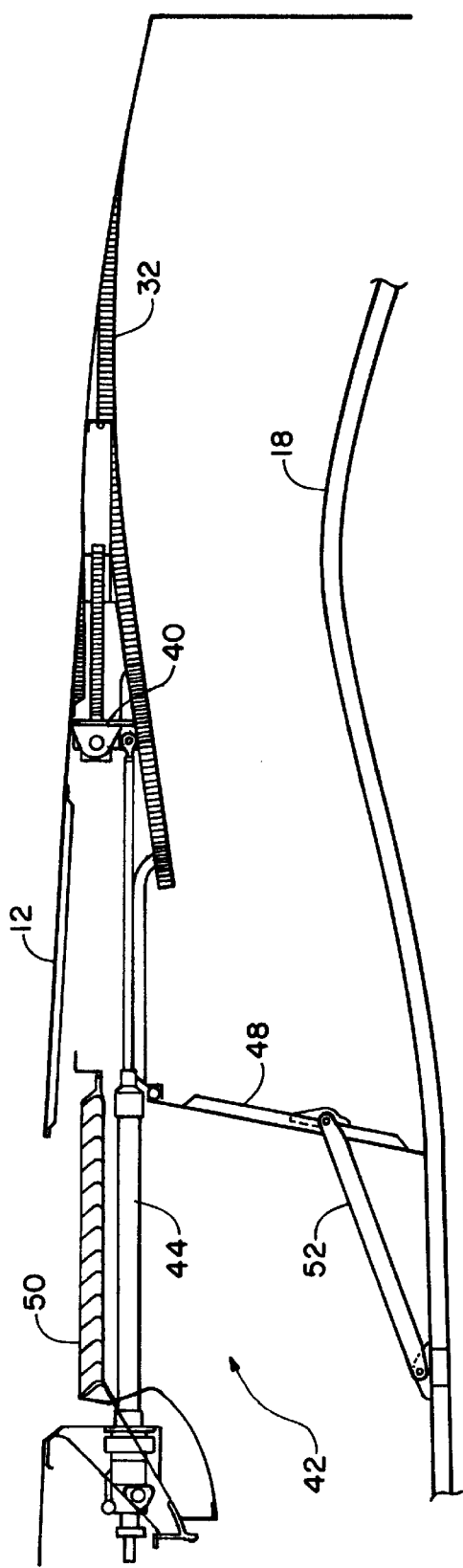
FIG. 8 is a partial cross section of the structure illustrating the thrust reverser deployed while the variable nozzle structure is deployed.

Referring now to FIGS. 7 and 8, another feature of the novel invention is illustrated. As shown, the variable nozzle structure 10 is advantageously employed with a blocker door/cascade type thrust reverser 42. The thrust reverser 42 is deployed by translating the translating cowl 12 aft by actuating suitable actuators 44 with the translation of such cowl 12 causing drag links 52 to rotate the associated blocker doors 48 downwardly and inwardly to a fan air stream blocking position to block such fan air stream flow. Blockage of the fan air stream by the blocker doors 48 causes the fan air stream to flow through the cascades 50, that are now uncovered, so as to be directed outwardly and forwardly in a predetermined direction.

In FIG. 8 it will be seen that since the trailing edge portion 14 that provides a variable nozzle for the propulsion system may be translated independently of the translation of the translating cowl 12 it is possible to fully deploy the trailing edge portion 14 when landing to increase the rate of descent of the aircraft and to be placed in the best position in the event that the landing is aborted. FIG. 8 illustrates the trailing edge portion 14 in a fully deployed position with the landing having been made and the thrust reversing procedure initiated by the deployment of the translating cowl 12 aft to a full thrust reversing position.

Figure 9:
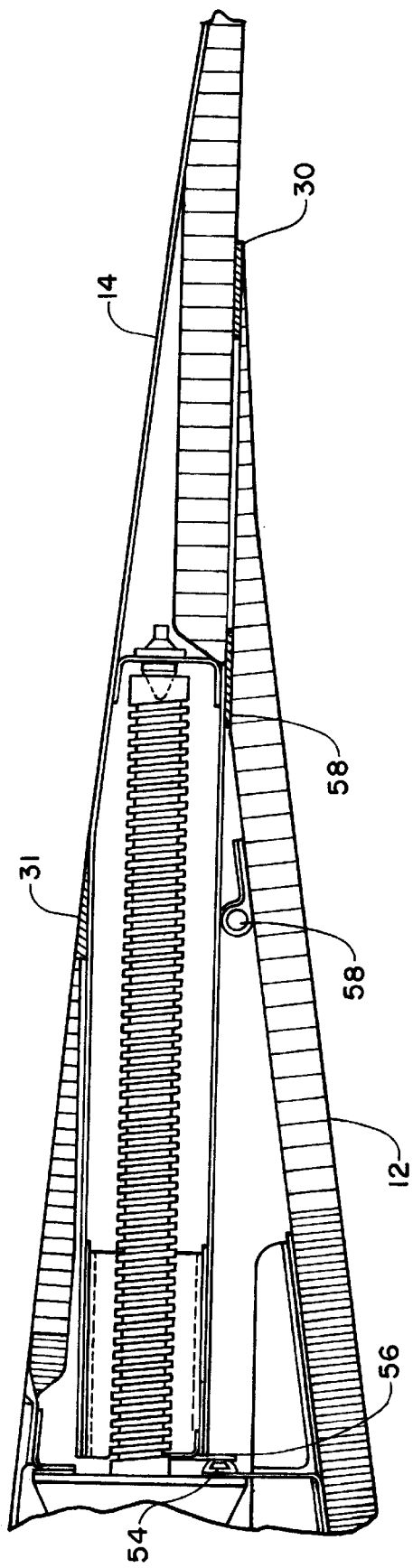
FIG. 9 is a partial detail cross section of the structure which particularly illustrates sealing means for the variable nozzle structure.

Referring now to FIG. 9, the sealing arrangement for the trailing edge portion 14 within the cavity 26 of the translating sleeve 12 is illustrated. The primary sealing arrangement for the trailing edge portion 14 within the cavity 26 of the cowl 12 is provided by a first sealing means, shown as an elastomeric bulb seal 54, which is disposed within the translating sleeve 12 and that cooperates with a flange 56 for sealing engagement therewith when the trailing edge portion 14 is in a stowed position. The primary sealing arrangement also includes a second sealing means, shown as an elastomeric bulb seal 58, that is disposed on the inner surface of the cavity 26 and which cooperates with the other side of the flange 56 for sealing engagement when the trailing edge portion 14 is fully deployed, as shown in FIG. 4.

A secondary sealing arrangement for the trailing edge portion 14 within the cavity 26 of the translating cowl 12 is provided by the spaced rub strips 28 and 30 that are disposed on the lower inner surface of the cavity 26 and rub strip 31 disposed on the outer inner surface of the cavity 26. The rub strips 28, 30, and 31 provide a secondary sealing arrangement with their primary function being to assist in the sliding translation of the trailing edge portion 14 within the cavity 26 of the cowl 12.

Figure 10:
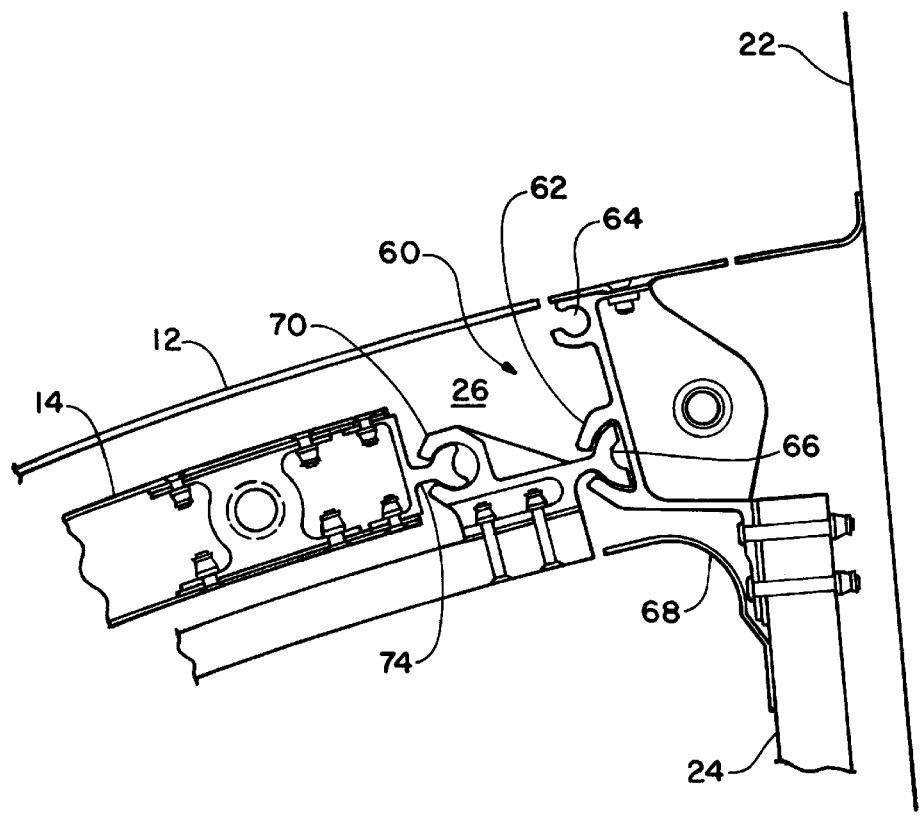
FIG. 10 is another partial cross section of the structure taken along the lines 10—10 in FIG. 5 and illustrating a double slider track arrangement for independent translation of the variable nozzle structure portion and the translating cowl.
Figure 11:
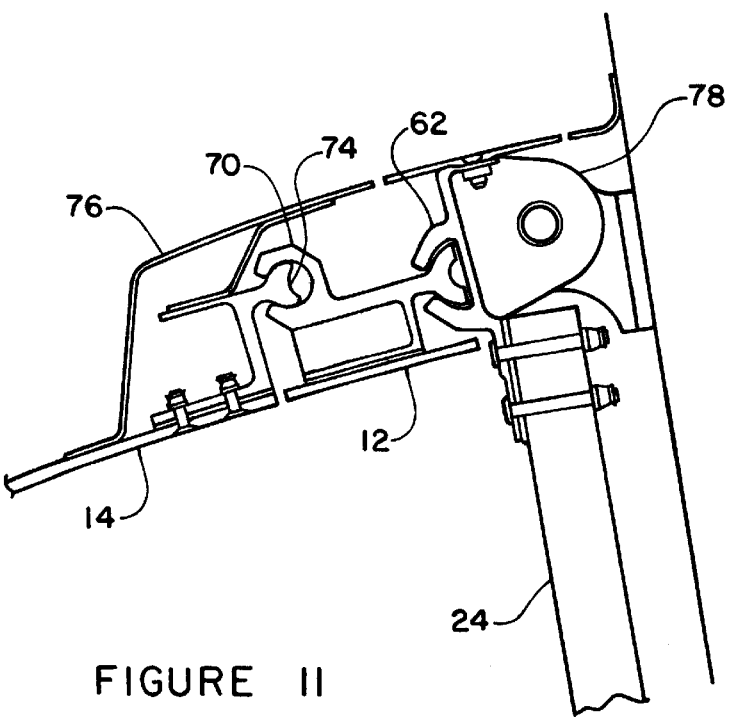
FIG. 11 is another partial cross section of the structure taken along lines 11—11 in FIG. 5.

Referring now to FIGS. 10 and 11, the unique double slider track arrangement of the variable nozzle arrangement 10 which permits independent translation of the translating cowl 12 and the trailing edge portion 14 and that provides sealing along the longitudinal travel of the trailing edge cowl portion 14 is illustrated. Referring first to FIG. 10 taken along lines 10—10 of FIG. 5, a novel double slider track arrangement 60 includes a first track arrangement including an inner track 62 and an outer track 64 for slidably receiving an inner slider 66 and an outer slider (not shown) to permit axial translation of the cowl 12 therealong. The first track arrangement is secured to the fixed portion of the nacelle system. A suitable longitudinally extending fairing 68 is attached to the bifurcation panel 24 primarily for aerodynamic purposes. Appropriate anti-friction means is disposed between the slider 66 and the track 62 to minimize the friction therebetween and enhances its sealing capability. The track arrangement 60 further includes a second track secured to the translating cowl 12 and including an axially extending track 70 which slidably receives a slider 74 which is secured to the trailing edge portion 14 of the variable nozzle 10. As before, a suitable anti-friction material is interposed between the track 70 and the slider 74 carried by the trailing edge portion 14.

In FIG. 11 taken along lines 11—11 of FIG. 5, it is further seen that a suitable fairing 76 is secured to the upper portion of the trailing edge portion 14 of the variable nozzle 10 and translates therewith. The fairing 76, seen also in FIG. 1, cooperates with the pylon 22 and is provided for aerodynamic purposes. It is also seen that the bifurcation panel 24 is suitably journalled to the pylon 22 by a suitable bearing arrangement 78 to permit access as required to the nacelle system and the core engine of the propulsion system as is well known in the art. Thus, the novel slider and track arrangement permits independent and simultaneous deployment of translating fan cowl 12 and trailing edge cowl portion 14 and also provides longitudinal sealing against leakage of the pressurized fan air stream and to thereby enhance the thrust of the core engine.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A structure to provide a variable nozzle for the fan air flow of an aircraft gas turbine engine, the nozzle being defined by the spacing between a trailing edge portion of the translating cowl and the core engine housing to provide a determinable exit throat area for such fan air flow, said structure comprising:

a generally annularly shaped translating cowl that is spaced from and which surrounds a portion of an aft portion of the housing of the core jet engine, said cowl being translatable for thrust reverser purposes and having an annular horizontally extending cavity provided at its trailing edge;

a first actuator means cooperating with said translating cowl to reciprocally translate said cowl longitudinally;

a generally annularly shaped nozzle trailing edge portion which is positionable within said cavity and reciprocally extensible from a first stowed position to a second extended deployed position, and a second actuator means cooperating with said nozzle trailing edge portion to provide reciprocal determinable extension thereof whereby the throat area defined by the trailing edge portion and the core engine housing may be varied by a predetermined amount in order to provide an optimum throat area for a flight condition of such aircraft jet engine without choking the core jet engine by diminishing the flow of such fan air upstream of such variable nozzle during an extension of said nozzle trailing edge portion.

2. The structure of claim 1 where the trailing edge portion is provided on its inner surface with an acoustic attenuation treatment whereby when the trailing edge portion is determinably extended aft the portion of such acoustic treatment that was previously received within said fan cowl cavity is exposed to the fan air stream to provide additional acoustic attenuation by said structure.

3. The structure of claim 2 wherein said second actuator means is positioned within said translating cowl and which is determinably actuable to reciprocally extend the trailing edge portion from the translating cowl cavity a predetermined distance.

4. The structure of claim 3 wherein said second actuator means comprises a plurality of annularly spaced actuators, each actuator being secured at one end to said translating cowl and being secured at the other end to the trailing edge portion for the purpose of reciprocally translating the trailing edge portion from a stowed to a deployed position.

5. The structure of claim 4 wherein each actuator is a ball and screw type actuator.

6. The structure of claim 4 wherein each actuator is an hydraulic type actuator.

7. The structure of claim 1 which further includes seal means interposed between the trailing edge portion and an inner surface of said cavity provided in said translating cowl to preclude air leakage therebetween.

8. The structure of claim 7 wherein the seal means includes spaced elastomeric bulb seals positioned on the inner surface of said cavity and cooperating with an inner flange of the trailing edge portion to provide sealing therebetween in the stowed and deployed positions.

9. The structure of claim 1 which further includes a forward fixed cowl portion and said translating cowl is fixed immediately aft of said fixed cowl portion.

10. The structure of claim 9 which further includes longitudinally extending fixed track means that cooperates with slider means carried by said translating fan cowl for determinable longitudinal movement therealong and track means carried by said translating cowl which cooperates with slider means carried by the trailing edge portion to permit longitudinal motion independent from said translating cowl portion.

11. The structure of claim 10 wherein said cooperating slider and seal means provides sealing between said track means and the trailing edge portion during reciprocal movement of the trailing edge portion and when it is positioned in a deployed position and sealing between said track means and said translating cowl in stowed and deployed positions.

12. The structure of claim 9 wherein the trailing edge portion is translatable aft a distance sufficient to increase the exit throat area defined by trailing edge portion and the core engine housing by at least 10 per cent over the original exit throat area when the trailing edge portion is in its stowed position.

13. The structure of claim 9 which the translating cowl and the trailing edge portion are translatable simultaneously and also independently of each other by selective actuation of said first and second actuator means.

14. The structure of claim 9 which further includes thrust reverser means carried by the translating cowl which are actuable when the translating cowl is translated aft to a deployed position to block the fan air stream and direct it forwardly upon command.

15. The structure of claim 14 wherein said thrust reverser means includes a plurality of circumferentially arranged blocker doors which are deployed to block the fan air stream when the translating cowl is deployed aft and a cascade means which is exposed when the translating cowl is deployed aft to direct the blocked fan air stream outwardly and forwardly.

16. A method for varying the exit throat area of a nozzle for the fan air stream of an aircraft gas turbine engine, the exit throat area being determined by the core engine housing and the trailing edge of the translating cowl, which method comprises;

providing a translating cowl for an aircraft gas turbine engine;

providing an axially extending cavity in the aft portion of the translating cowl;

positioning a trailing edge cowl portion in such cavity to provide a trailing edge portion and determinably translating the trailing edge cowl portion independently of translation of said translating cowl, to provide a desired exit throat area for a particular aircraft flight condition without choking such aircraft gas turbine engine by restricting said fan air flow during such period as said trailing edge cowl portion has been determinably translated.

17. The method of claim 16 which further includes the step of providing a forward fixed fan cowl immediately adjacent to said translatable cowl and translating the translatable cowl and the trailing edge independently to provide a desired exit throat area.

18. The method of claim 17 which further includes the step of providing the translating cowl with thrust reverser structure which is operable, when the translating cowl is deployed aft, to block the fan air stream and to direct it outwardly and forwardly in a predetermined direction.

19. The method of claim 18 which further includes the step of providing actuator means which are determinably actuable to translate reciprocally the trailing edge portion within the cavity provided in the translating cowl.

20. The method of claim 19 which further includes the step of providing seal means to preclude fan air stream leakage between said translating cowl and the reciprocal trailing edge portion during a flight condition of the aircraft.

* * * * *